FACSIMILE SYSTEM WITH TWO SPEED MAGNETIC STORAGE

Filed Oct. 13, 1967 2 Sheets-Sheet 1

INVENTOR:
Peter Amass

By Smyth, Roston & Pavitt
ATTORNEYS

FACSIMILE SYSTEM WITH TWO SPEED MAGNETIC STORAGE

Filed Oct. 13, 1967

2 Sheets-Sheet 2

INVENTOR:
Peter Amass
By Smyth, Roston & Pavitt
ATTORNEYS

United States Patent Office 3,510,577

Patented May 5, 1970

3,510,577

FACSIMILE SYSTEM WITH TWO SPEED MAGNETIC STORAGE

Peter Amass, Camarillo, Calif., assignor to Minnesota Mining and Manufacturing Company, St. Paul, Minn., a corporation of Delaware Filed Oct. 13, 1967, Ser. No. 675,243

Int. Cl. H04n *1/28, 1/42*

U.S. Cl. 178—6.6 19 Claims

ABSTRACT OF THE DISCLOSURE

A facsimile record-reproduce system is disclosed where facsimile signals are recorded first and subsequently reproduced for image compositioning by the associated facsimile unit or for transmission to another remotely positioned system. Differently located facsimile systems communicate through the transmission facility and through their recorders at respective high record and reproduce speeds. Each tape recorder communicates with its associated facsimile unit at low speed. During facsimile recording reference signals are recorded concurrently and the induction motor of the recorder-reproducer is controlled in open loop. During reproduction the reproduced reference signals are phase compared with a concurrently produced reference signal, the phase difference is amplified and modified and controls formations of a D-C component serving for developing a controlled braking torque for the otherwise A-C driven induction motor.

The present invention relates to facsimile record-reproduce systems. The system in accordance with the present invention is destined primarily for providing indirect coupling of a facsimile unit to a facsimile transmission facility. The facsimile unit will be comprised of a facsimile transmitter converting an image of a document into an electrical signal: The document to be duplicated is line scanned and the result of the scanning is presented in the form of an electrical signal. That electrical signal is to be transmitted to a remote location for purposes of composing a duplicate of the document. The station providing the electrical facsimile signal and/or a remotely located station, is equipped with means for converting electrical facsimile signals into visible information to provide a duplicate of the document represented by the facsimile signals.

The invention now relates to a system in which the electrical signals are not directly transmitted from the facsimile transmitter in one station to the facsimile receiver in another station. Instead, they are stored on magnetic tape before and/or after transmission. The transmission facility then communicates with tape recorders in either station. The facsimile signals produced in one station are recorded first and reproduced subsequently; the reproduced signals are transmitted to the other station. The station receiving the signals likewise records them first and the duplicate is composed subsequently from the reproduction of the recorded signals.

The communication of the facsimile unit with its tape unit, be it for recording or reproducing, will be carried out at a speed which is commensurate with the scanning capabilities of the facsimile unit. On the other hand, tape recorders communicate through the transmission facility preferably at a higher speed of the tape to foreshoten the transmission time. Even if the recorders would communicate with each other at the same speed with which either of them communicates with its facsimile unit, the transmission facility is used thereby more economically, particularly in case the number of documents to be duplicated is rather large. If facsimile units communicate directly with each other, the exchange of documents in the facsimile unit in the transmit mode and the reloading of the unit with clean paper in the receive mode, is a pause in which the transmission facility is actually not used. On the other hand, if the remote transmission occurs from recorder to recorder, the entire sequence of electrical signals for a large number of documents can be transmitted in one continued operation without such pauses, thus eliminating for the transmission the periods of time it takes to exchange documents and paper.

The inventive system includes improvements concerning the control of the tape drive for such a system. The tape drive is particularly adapted for the recording of a facsimile signal and includes an induction motor energized from the mains and position controlled through a control circuit. This control circuit provides a D-C component to the induction motor operating as a retarding torque on the motor. The controlled D-C component is superimposed upon the A-C voltage fed to the induction motor by changing the impedance condition in the A-C supply circuit for the motor for half waves of one particular polarity only, so that the A-C voltage applied to the motor has a residual D-C component. The circuit used for obtaining this operation may include an electronic switching element, such as a silicon controlled rectifier which turns on and off a particular resistance for the induction motor, particularly for the main field winding thereof.

The silicon controlled rectifier is fired at a particular phase angle in relation to the A-C supply. The firing angle controls the magnitude of the D-C component superimposed upon the supply voltage. The firing angle is determined through a control circuit which converts a D-C control signal into a phase angle of a firing pulse for the silicon controlled rectifier. The D-C signal controlling this firing angle is developed by suitable circuit elements during both the record mode and the reproduce mode. The D-C control signal is a constant value so that the phase angle is kept constant during the record mode. Therefore, the motor advances the tape in the record mode while being subjected to a particular, constant braking force. Concurrently in the record mode the facsimile data are recorded on the tape together with constant frequency reference signals for providing continuously and progressively a particular phase relationship between the progressing facsimile data and the reference signal serving as relative time base for the facsimile data so that progressive waves of the reference signals as recorded on the tape provide a spatial reference to the facsimile data concurrently recorded.

During playback the reproduction signals are reproduced and separate signal trains are provided, one for the facsimile data and one for the reference signals. The reproduced reference signals are then phase compared with reference signals, preferably from the same source used during the record mode. However, in the preferred mode of practicing the invention the tape may move at different speeds during recording and reproduction, and the frequency of the reference signals, either of the reproduced ones or of the locally produced reference signals during reproduction must be caused to differ from the frequency of the reference signals when recorded in accordance with the different tape speeds. The phase comparison is thus carried out only between signal trains of comparable frequency.

The phase difference is monitored continuously and a D-C signal in accordance therewith is established. The D-C signal is a true error signal and is processed for maximum value of error signal frequencies of a few cycles per second. The processed signal is used to provide the D-C control signal for the purposes of establishing the above phase angle for the motor control circuit. During the reproduce mode the braking torque applied to the induction motor varies in accordance with the requirement to maintain constant phase between the reproduced reference signals and the concurrently provided reference signals.

A variable speed transmission is interposed between the motor and, for example, the capstan driving the tape in order to provide for the different speeds.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawing, in which:

Figures 1, 3, 4:
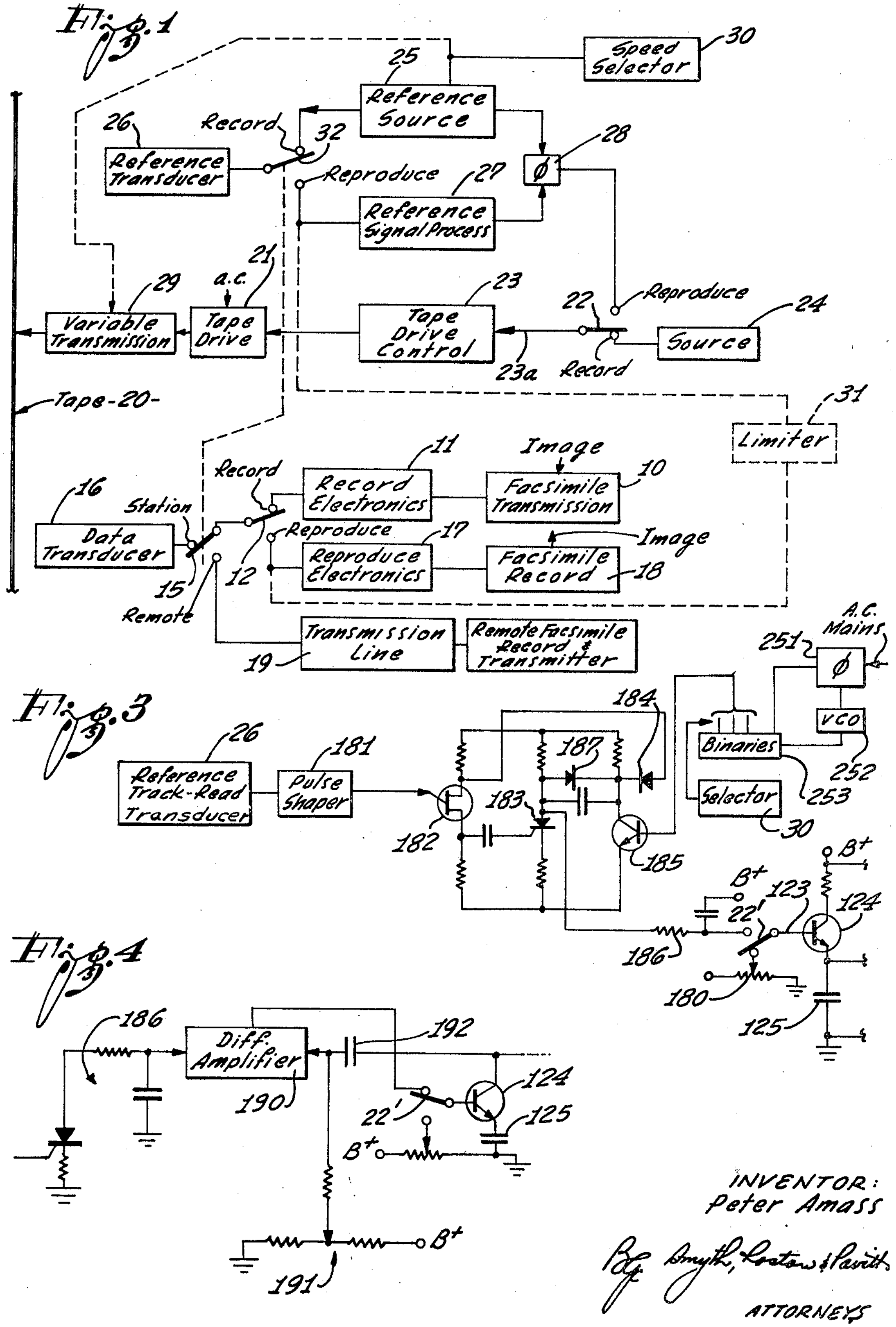
FIG. 1 illustrates a block diagram of the general facsimile unit-tape recorder system for one station in accordance with the present invention.
Figures 2, 2A:
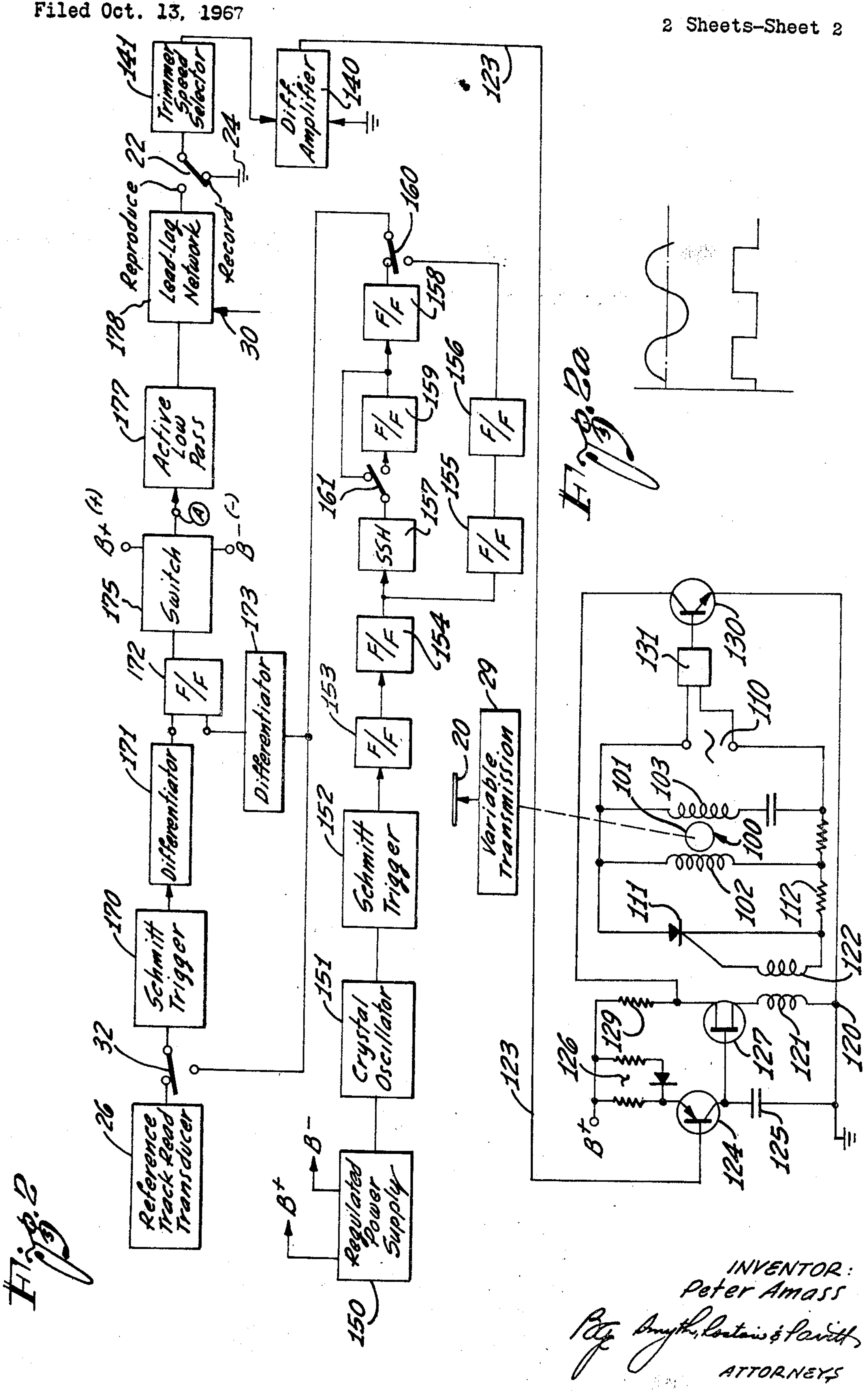
FIG. 2 illustrates partially a circuit diagram and partially a block diagram, the control circuit for the tape drive motor in the system shown in FIG. 1.

FIG. 2*a* illustrates waveforms in the circuit shown in FIG. 2;

FIG. 3 illustrates partially a block diagram and partially a circuit diagram and a modification and simplification of the motor control circuit shown in FIG. 2;

FIG. 4 illustrates partially a block diagram and partially a circuit diagram modification of the circuit shown in FIG. 3.

Proceeding now to the detailed description of the drawings and FIG. 1 thereof there is shown the preferred embodiment of the present invention. Reference numeral 10 denotes a facsimile transmitter of the type which scans a document and converts an image of the document into an electrical signal in a low frequency, base band range. The signal is fed to a circuit network 11 which includes electronics for processing the output signal of the facsimile transmitter 10 to obtain a signal in a format suitable for recording. For example, the network 11 may include an audio frequency oscillator or means for receiving such oscillations if produced otherwise. These oscillations are used as carrier signal and modulated by the facsimile base band signal.

The output signal of record electronic circuit network 11 is passed through a mode switch 12 when the system is in the record mode. The switch 12 has an alternative position defining the reproduce mode in which the output side of the circuit network 11 is disconnected from the illustrated circuit. In the record mode for recording the facsimile data produced by transmitter 10 it is further required that a second mode switch 15 is in the "station" mode. The alternative position of switch 15 defines and establishes a "remote" mode to be described below. If the mode switch 12 is in a record mode and the mode switch 15 in the station mode, a data transducer 16 can receive the facsimile signals as processed by the network 11 for purpose of recording same on a tape 20.

The tape 20 in particular is a magnetic tape and the transducer 16 inscribes one particular track on the tape. In the alternative position of mode switch 12, with mode switch 15 remaining in the station mode position as illustrated, the data transducer 16 operates as a read or reproduce transducer and feeds therefore its output signals to a reproduce electronic network 17 which includes a demodulator. The output signal of network 17 is a facsimile base band signal which in particular is a scanning signal representing directly facsimile video information. This facsimile signal is fed to a facsimile receiver 18 which reproduces an image. In particular, receiver 18 converts the electric signal from the network 17 into optical contrast information, for example, by operating a facsimile printer providing a printout. The printer may be a stencil and the image is produced on pressure sensitive paper.

In the alternative position of mode switch 15 the data transducer 16 is connected to a facsimile signal transmission facility to send the electrical signal as read by transducer 16 from tape 20 through a transmission line 19 to a remotely positioned facsimile transmitter and receiver system similar to the one described in the previous paragraphs.

Tape 20 is advanced by a tape drive 21 of suitable design. For example, the tape drive may be an A-C powered induction motor which receives a variable D-C signal for speed control. The magnetic field resulting from the D-C applies a braking force to the tape drive motor. Upon varying the amplitude of the D-C signal the speed of the motor varies acocrdingly. The control circuit for the tape drive which provides variable speed characteristics for this motor is summarily depicted in block 23. The network 23 receives D-C control signals from a channel **23*a* to be processed by the network 23 in such a manner that the tape drive 21 operates with an A-C–D-C composite signal and obtains a characteristic so that the tape speed follows the control characteristics as required in accordance with the D-C command signal of channel 23*a***.

A mode switch 22 which is ganged with mode switch 12, connects the input channel **23*a* to a constant voltage source 24 in the record mode to control the tape speed in accordance with open loop conditions and in accordance with the control signal furnished by the source 24 to the control unit 23. Still in the record mode, a source 25 produces an A-C output, reference signal which is passed to a second transducer 26 through a third mode switch 32. Transducer 26 inscribes a second, parallel track upon tape 20, particularly it is the constant frequency signal derived from reference source 25**.

In the reproduce mode, mode switches 22 and 32 change their respective positions. The reference signal transducer 26 operates also as reproduce transmitter and reads this second control track. The reproduced A-C signal is applied to a suitable signal processor 27 which may, for example, change the frequency of the signal to a more suitable value. The reference source 25 and the signal processor 27 apply their respective output signals to a phase detector 28 which produces a D-C signal. Frequency and phase variations of the reproduced reference signal (output of the track) represent actually the speed variations tape 20 underwent during the record mode as well as the speed variations of the tape during the reproduce mode. The frequency of source 25 is presumed to be constant to a degree, far in excess of the speed constancy of the tape. Thus, the phase and frequency relationship between the direct and the reproduced reference signals at any instant controls the D-C output signal of the phase detector, which in turn controls the tape drive towards constancy of the D-C output of the phase detector. Thus, the tape drive is controlled for constant phase and frequency of the reproduced reference signals relative to the direct reference signals. This may require direct production of tape speed variations if a previous tape speed varation during recording of a track portion does not happen to be offset by an oppositely equal tape speed variation during reproduction of that track portion. The essential feature is, that the phase relationship between facsimile data and reference signal is maintained on the tape during recording as particular spatial relationship irrespective of speed variations. That phase relationship is maintaned further during reproduction, again irrespective of speed variations. The tape control now fixes the phase of the reproduced reference to the direct reference, so that impliedly the reproduced data have the same and correct phase among each other which they had during their initial production.

In addition, there may be provided a speed selector 30 which changes the frequency of the reference source 25, and there is a corresponding variable transmission 29 which is interposed between drive 21 and tape 20. This way the same data and reference can be recorded and reproduced at different speeds which is beneficial for operating the system very efficiently. The reproduction and transmission of fascimile data may be carried out at a high speed to reduce the transmission time. The facsimile units themselves may operate at low speeds, as this is more economical. Thus, between stations, the communication runs directly between tape units, and the facsimile unit in either station communicates directly only with its tape unit; time independent from the actual remote transmission, for example, to benefit from low night rates if a public transmission facility is used. However, a low speed facsimile unit is more economical. Furthermore, where several documents are to be duplicated, the time of exchanging documents (and clean paper at the receiving end) is not wasted as unused transmission time: The recording of the facsimile signals on tape is carried out with pauses as are required for changing the documents so will be reproduction of the tape for image composition in the other station. Reproduction of tape signals for transmission and corresponding recording of transmitted signals will be carried out uninterruptedly!

The system in any particular station therefore has altogether four operating modes: The first one is the station record mode in which all the modes switches 15, 12, 22, and 32 are in the position illustrated. The speed selector 30 selects, for example, a low recording speed. The facsimile transmiter 10 forms signals from a scanned document and the corresponding data are being recorded through the transducer 16 on the tape. Concurrently thereto the low speed (low frequency) reference signal is recorded by transducer 26 in a second track on the tape.

When the recording, or the recording of facsimile signals for several documents has been completed at any time thereafter and not necessarily following immediately, the system may be switched to the reproduce-remote mode. Switch 15 changes position to establish the remote mode and mode switches 22 and 32 change position also to establish the reproduce mode; the position of switch 12 is immaterial. The speed selectors 29 and 30 will preferably be set now to select a rather high speed. Therefore, the tape will be moved by the tape drive 21 at a rapid rate, the transducer 26 monitors the control track and the phase detector 28 produces a D-C control to maintain the speed of the tape for constant frequency and phase of the reproduced reference signals. Concurrently the data transducer 16 reads the data track and passes the reproduced facsimile data to the transmission line 19 for transmission to the remotely positioned facsimile receiver and transmitter facility. The process which is carried out in that remote station can best be understood from describing the third mode of operation which is the remote-record mode.

In this remote-record mode, the mode switch 15 is in the same position as in the remote-reproduce mode because switch 15 distinguishes merely between the two remote modes and the two station modes. The position of mode switch 12 is again immaterial, but switches 32 and 22 are in the record mode. In this mode data are received through the transmission line 19 for recording them on the tape 20. Again, speed selectors 29 and 30 are set for a high speed, and the reference transducer 26 records a control track which accompanies the recording of data. Tape drive 21 is controlled from the control circuit 23 through the source 24.

The final and fourth mode is the station-reproduce mode in which data are read from the tape for the purpose of producing or recomposing an image. The mode switch 15 has the illustrated station mode position whereas the switches 12, 22 and 32 are in the reproduce mode position. The operation is to be carried out at low speed so that speed selectors 29 and 30 are adjusted for a low speed operation. The tape drive 21 is controlled through the phase detector 28, using a low speed reference. The directly produced reference signals are compared with the reproduced reference signals and the output of phase detector 28 controls the tape drive 21. Data transducer 16 reproduces the facsimile data and passes them through the switches 15 and 12 to the reproduce electronic 17 for demodulation and the demodulated, base band. Signals control the image production in facsimile receiver 18.

One can see, therefore, that the transmission of images is carried out indirectly, through the tape recording process, so that the transmission through the transmission line is independent from the conversion of an image of pictorial information into electrical signals or vice versa. It is of further significance that the variable speed control of the tape permits the transmission at a higher rate than the scanning.

FIG. 1 also includes a modification which obviates the use of a reference transducer 26, i.e., it obviates the utilization of a special reference track. In this case the reference source 25 can be regarded as being incorporated in the record electronic 11 or the facsimile unit and, therefore, can also be eliminated as a separate element but retains its functional identity as reference source for purposes of the invention. This embodiment requires that the reference oscillator controls also the facsimile transmitter and receiver drives. The essential aspect is that there is precise phase synchronism between the carrier, recorded as facsimile modulated carrier on the tape, and the scanning operation of the facsimile unit. In this case the carrier signal as recorded can be used for control purposes. Therefore, the limiter 31 illustrated as an alternative element can be connected to the reproduce electronic 17. The output signals of limiter 31 are individual signals analogous to the ones produced by the data transducer 26. During the reproduce mode the tape drive is controlled in a similar manner in that the output signals of the limiter, after conversion into a pulse sequence, are compared in the phase detector 28 with the same oscillation which controls the facsimile transmitter and receiver drives.

Proceeding now to the description of FIG. 2 there is shown partially as block diagram and partially as a circuit diagram the preferred mode of controlling the tape drive during the reproduce as well as during the record modes. The tape drive motor 100 may be an induction motor of the capacitor type having a rotor 101, a main field winding 102 and an auxiliary winding 103 connected in series with the capacitor 104. These elements are connected in the usual manner to the main power supply source which may be the mains such as 110.

Motor 100 will normally run at rated speed under the load conditions as existing for the tape drive mechanism. If a D-C component is applied to the main winding 102, the resulting D-C magnetic field component is stationary with reference to the rotor whereas the A-C induced magnetic field rotates. The stationary D-C magnetic field is equivalent to an overload condition and, therefore, has a braking effect on the rotor. The D-C voltage is derived from the A-C source 110 through the control of a rectifier, for example a silicon-controlled rectifier 111 connected in series with a resistor 112 to the A-C source 110. The silicon-controlled rectifier 111 can conduct only during one-half cycle of each full wave of the A-C supply voltage. Thus, whenever conductive SCR 111 applies a half-wave to and across the main winding 102. The magnitude of the half-wave is attenuated in accordance with the resistance of resistor 112 changing the impedance in the circuit for the main winding 102. As illustrated, resistor 112 is a variable one, and the variable arm of this resistor provides some adjustment over motor speed by varying the D-C current through the motor for any given firing phase angle of the SCR 111 and is required to achieve compatibility between tapes recorded on one machine and played back on another. Though the system is phase-locked in the reproduce mode as will be described below, no frequency loop is provided in the servo which reduces the acquisition range. The frequency loop, as such, is provided by the motor which runs at some nominal speed (which varies between machines due to the variations between motors and frictional loading) and this must be adjustable to achieve standard tape speeds between machines.

The D-C component introduced into the energization voltage of the A-C motor depends on the period of time within each half cycle of possible conduction of silicon-controlled rectifier 111 during which it actually conducts. For convenience of reference, I shall speak of a positive half-wave when the polarity of the half-wave permits conduction of SCR 111. The control electrode of the silicon-controlled rectifier 111 is connected to a secondary winding 121 of a transformer 120; the other side of this secondary winding 122 is connected to the cathode of the silicon-controlled rectifier 111. Thus, when a positive voltage as defined is developed across the secondary winding 122, silicon-controlled rectifier 111 will fire and continues conduction until the voltage reverses across its main electrodes.

The D-C component introduced into the energization circuit of the motor depends on the firing angle for SCR 111 relative to an upward zero crossing of a positive half-wave of the A-C supply voltage so that the effective D-C component in the energization circuit of the motor can be varied by varying the firing angle for SCR 111. For producing the proper firing angle a particular signal is developed across the primary 121 of the transformer 120. It is thus the function of the transformer 120 to produce a steep voltage pulse, particularly a voltage pulse having a steep leading edge at a particular time in relation to the phase of the voltage of source 110. That phase relationship is to be a variable one in accordance with required control to be exerted upon the motor 100. In particular the phase angle has to depend on the amplitude of a D-C signal in a line 123.

The D-C voltage in line 123 is the equivalent of a speed or time displacement error signal during reproducing as will be developed more fully below. This D-C signal, however, is not zero for zero error, but has a particular value as used during recording. The D-C signal in line 123 is applied to the base electrode of a transistor 124 which serves as a current source for a capacitor 125, together with a diode and resistance network 126. Diode-resistor network 126 connects the emitter of transistor 123 to B+, capacitor 125 is connected between ground and collector of transistor 124. The D-C voltage in line 123 as applied to the base electrode of transistor 124 will control the rate of charge of capacitor 125. When a particular charge level has been reached the voltage developed across the capacitor 125 becomes effective as firing voltage for an unijunction transistor 127 resistivity connected with one of its two base electrodes to B+ and with its other base electrode the unijunction transistor 127 connects to the primary winding 121 which is connected to ground with its respective other side.

The effective potential across the main electrodes of unijunction transistor 127 is controlled from a gating circuit which includes a transistor 130 the base-emitter path of which is connected between ground and one of the terminals of source 110. The connection 131 provides in addition suitable reference to ground to permit coupling the circuit to the mains. The collector of transistor 130 connects to the one main or base electrode of the unijunction transistor 127 which connects through a resistor 129 to B+. The collector resistor 129 of transistor 130 is thus common to unijunction transistor 127 and transistor 130. Transistor 130 is controlled from the A-C of the mains 110 to be rendered conductive at saturation very shortly after the zero crossing of the A-C voltage towards that particular negative half-wave for which the silicon-controlled rectifier 111 cannot conduct. The operation of this circuit will best be understood from reference to the timing diagram shown in FIG. 2*a*.

The top line of FIG. 2*a* shows the A-C voltage as it is effective across the main electrode of silicon-controlled rectifier 111. The second line from the top shows the resulting output voltage across the collector and emitter electrodes of the transistor 130. As stated, silicon-controlled rectifier 111 can conduct for positive half-waves and transistor 130 is rendered conductive during the negative half-wave periods of the A-C voltage source. During the periods when the transistor 130 conducts at saturation its collector is effectively at ground potential and the same potential is applied to the electrode of unijunction transistor 127 which is connected to the resistor 129. Accordingly ground potential prevails across both electrodes of unijunction transistor 127, no voltage is applied across primary winding 121 and the control electrode of the unijunction transistor 127 is likewise essentially on ground potential. Thus, the conductive transistor 130 short-circuited and disables transistor 127, and its control electrode is clamped to the approximately common potential of its main electrodes which is ground, which means that capacitor 125 cannot charge.

Essentially at the beginning of each positive swing of the A-C supply voltage transistor 130 ceases to conduct so that the B+ voltage can become effective at the electrode of unijunction transistor 127 to which the resistor 129 is connected. The voltage across capacitor 125 comes now under exclusive control of the transistor 124. At the time when positive bias is applied across the unijunction transistor 127 for the first time (in an A-C cycle) capacitor 125 is still essentially discharged so that the unijunction transistor 127 will not fire but remains unconductive.

Capacitor 125 will charge at that particular rate and in dependence upon the D-C voltage applied through line 123 to the base electrode of transistor 124. Sooner or later firing potential for the unijunction transistor 127 will be reached whereupon the unijunction transistor 127 is rendered conductive. The resulting current through unijunction transistor 127 produces a steep voltage pulse in the secondary winding 122 firing the SCR transistor 111. SCR 111 remains conductive for the remainder of this particular positive half wave. In the meantime capacitor 125 has discharged through the conductive unijunction transistor 127 and stays discharged for the same remainder of the positive swing of the A-C wave. During the subsequent negative voltage swing transistor 130 is rendered conductive again and capacitor 125 is clamped to ground.

It can thus be seen that the particular D-C voltage in command line 123 is converted into a particular rate for charging capacitor 125. This rate can also be construed as the slope of a ramp function. The gradual rise begins at a zero crossing of the supply voltage representative of the beginning of a positive half-wave. The voltage across the capacitor 125 increases at a rate determined by the signal in line 123. When a particular firing level is reached unijunction transistor 127 fires, whereupon the ignition pulse for the SCR 111 is produced. Therefore, the D-C signal 123 is translated into a particular phase angle respectively beginning with each positive voltage swing of the supply voltage for motor 100. This phase angle in turn controls the amount of D-C introduced into the motor cricuit. It follows, therefore, that the D-C signal in line 123 determines the rate of braking of motor 100 ultimately resulting in a particular speed control for the tape 20. Now the production of this signal in line 123 has to be considered.

The record case shall be discussed first, but in the record as well as in the reproduce mode, the signal in line 123 is derived from a differential amplifier 140 having two input terminals, one of which is connected to ground while the other input of the differential amplifier 140 is derived from a speed selected loop gain trimmer network 141. The speed selective trimmer network 141 comprises a plurality of resistors which connects one of three adjustable potentiometers between mode switch 22 and the second input of the differential amplifier 140. The input signal for the trimmer network depends to some extent on the tape speed and the resulting operating input frequencies. Network 141 modifies the amplitude to obtain the same motor speed control range irrespective of speed differences as resulting from speed adjustments by variable transmission 29 (FIG. 1). Since the actual load differs for different speeds, as selected by transmission 29, the control signal ranges unmodified by network 141 and the required control for any given error will differ to some extent even through the motor 100 is always controlled towards the same speed.

The differential amplifier 140 is connected to a voltage source and includes circuitry so that in case its two inputs are similar (ground potential) a particular, for example, a positive signal is applied to the output line 123. If the nonpermanently grounded input of the differential amplifier 140 goes negative, the output signal in line 123 declines, if the nongrounded terminal of amplifier 140 has a positive signal the output in line 123 increases.

In the record mode, as was mentioned above, a constant voltage potential source designated generally as 24 in FIG. 1 is connected to the control circuit for determining motor and tape speed in an open loop control configuration. In this particular embodiment source 24 is ground; ground is applied directly to the second input of differential amplifier 140 in the record mode. For lack of any other operating potential and because the trimmer networks 141 operates with ground as reference, it is actually rendered ineffective. Since amplifier 140 receives equal inputs, the particular signal it provides for this case passes into line 123 and motor 100 is braked in a particular, constant manner. The motor, however, may undergo fluctuations in accordance with voltage and/or frequency variations of the supply source, i.e., the mains 110. Therefore, the speed of the motor is controlled in an open loop configuration and in a particular manner, i.e., by a particular signal in line 123 which corresponds to an assumed time displacement.

In addition, in the record mode the control track is being inscribed as was outlined above pursuant to the description of the function of reference signal transducer 26. That particular signal does not influence at that time the motor control circuit; nevertheless the reference source is operative during the record mode because it furnishes the signal to be recorded as reference. Moreover, the same source is used as reference for the reproduced reference in the reproduce mode, it is thus advisable to describe the circuit providing the reference signal. In other words, we proceed now with the description of the details of a first example for reference source 25 of FIG. 1.

A voltage regulated power supply source 150 may be coupled to the mains through a transformer and may include a rectifier and voltage regulating stages to produce, for example, the B+ and B− voltages to be used throughout the circuit system for the supply of D-C. This voltage regulated power supply source 150 drives and energizes a local oscillator, for example, a crystal oscillator 151. In lieu of the crystal oscillator 151, a line-lock reference oscillator described below with reference to FIG. 3 could be used. The oscillator 151 produces a sinusoidal output which may have, for example, a frequency of 15,360 c.p.s. The sinusoidal wave of that frequency is fed to a pulse shaper 152, for example, a Schmitt trigger, to produce square waves of alternating polarity as the desired wave. Two cascaded flip-flops 153 and 154 are connected to reduce the frequency of the pulses furnished by Schmitt trigger 152 at a ratio 4:1, i.e., from 15,360 c.p.s. to 3,840 c.p.s.

Since the tape system described is assumed to be a three speed system, three different frequency trains are needed. The first one is derived in the following manner. Two toggle flip-flops 155 and 156 are cascaded, the input of the former connecting to the output of flip-flop 154 and the output of flip-flop 156 producing, possibly on a continuous basis, a signal of 1/16 of the oscillator frequency which is 960 c.p.s. If a connector switch 160 is in the alternative position then the 960 c.p.s. signal is being used, which is the highest output frequency of the reference source and corresponds to the fastest tape speed.

The two other frequencies are produced as follows: there is first provided a single shot or monovibrator 157 having its input side triggered by the output of flip-flop 154 to produce 1:3 frequency division. Thus, monovibrator 157 is triggered by a first output pulse of flip-flop 154, and remains in the astable state for two additional pulses of flip-flop 154, reverts back to the stable state to be triggered anew by the following pulse from flip-flop 154, etc. The output frequency of the pulses of monovibrator 154 is thus 1.28 kc. If a second selector switch 161 has a position as illustrated, the output of the flip-flop 157 is supplied to a toggle flip-flop 158 providing a 2:1 frequency reduction so that its output is a square wave train of 640 c.p.s. which becomes effective if the mode switch 160 is also in the illustrated position. Hence, the circuit is shown in a switching state for this second, intermediate reference frequency.

When switch 161 is in the alternative position but switch 160 remaining in the illustrated position, then the output of the single shot 157 is applied to a toggle flip-flop 159 which in this case controls in turn the toggle flip-flop 158, so that for that case the output of the latter is the lowest reference frequency of 320 c.p.s. Therefore, there are three wave trains available of respectively 320, 640 and 960 c.p.s. which frequencies are related at a 1:2:3 ratio.

During the record mode the mode switch 32 (see also FIG. 1) connects the output of selector switch 160 to the reference transducer 26 as aforedescribed, so that in dependence upon the position of the selector switches 160 and 161 a particular wave train is being recorded as reference signal. The motor speed is assumed to be adjustable by the variable transmission 29 also in corresponding 1:2:3 ratio. Thus, for each one of the three possible speeds the particular recorded reference signal on the reference track will always have the same wavelength on the tape, independent from the selection.

Proceeding now to the description of the reproduce mode, it should be repeated first, that the speed of motor 100 and therefore, of the tape, is controlled indirectly through whatever output differential amplifier 140 provides for developing particular braking torque. The feedback loop is closed in that the amplifier 140 is made to respond to the tape speed and position as to be described next. In the reproduce mode, the mode switch 32 is then set into the alternative position for disconnecting the reference track transducer 26 from the source of reference signals and connecting the transducer instead to a pulse shaper 170 which is a Schmitt trigger producing a train of square waves of the sinusoidal signal produced by the transducer 26 when reading the reference track. The concurrent reproduction of facsimile data has already been described.

The output of the Schmitt trigger is fed to a differentiator 171 producing a plurality of equidistantly spaced spikes in accordance with the leading and trailing edges of the signal train produced by Schmitt trigger 170. These spikes have alternating polarity and only one particular polarity is used to set a D-C type flip-flop 172. The reset input side of flip-flop 172 is controlled through a differentiator 173 from the reference pulse source 25, i.e., the particular signal as permitted to pass through selector switch 160 is differentiated and resets flip-flop 172.

It will be recalled that tape-record and tape-reproduce modes may operate at different tape speeds, but that the reference track signals have the same wavelengths on the tape. Thus, the particular frequency of the reproduced reference signal and of the set-control pulses for flip-flop 172 have a frequency proportional to the tape speed and which may be different from the frequency of the reference signals as they were recorded in the record mode. On the other hand, the frequency of the direct reference signals now effective as reset control pulses for flip-flop 172 is adjusted to be compatible with the tape speed in the reproduce mode. By way of example, the tape speed in the record mode may have been 3¾ i.p.s., the reference signal frequency was 320 c.p.s. In the reproduce mode the tape speed may now be 11¼ i.p.s. so that the reproduced reference signals have the threefold frequency, i.e., 960 c.p.s. Accordingly, the direct reference signal frequency in the reproduce mode must also be set for 960 c.p.s. (switch 160 in the alternative position). Flip-flop 172 is thus set by the reproduced reference signals and reset by the direct reference signals.

For proper facsimile reproduction, the phase relationship of the various facsimile signal increments to each other has to be maintained throughout which is represented by a constant phase as between reproduced reference and direct reference at any instant in the reproduce mode. A frequency deviation of the two signals from each other corresponding to a high frequency phase error and thus lasting relatively long in either direction will result in a completely distorted facsimile duplicate. Low frequency phase deviations will result in jittery and distorted image lines. Hence, the phase between reproduced and direct reference has to be kept constant.

One can see, therefore, that the flip-flop 172 is in effect the first portion of a phase detector to detect the phase difference between reproduced and direct reference signals. The periods in time for which flip-flop 172 stays set is indicative of the phase angle between the wave trains respectively controlling set and reset input sides. The frequency of the output wave train produced, for example, at the set output side of flip-flop 172 is, of course, on the average the same as the frequency of either input signal. Frequency deviations of the reproduced reference signals are expected to occur only for short duration and to be effective merely as temporary phase changes. In closed loop operation, the system is used to maintain a particular desired phase relationship of reproduced and direct reference so that the periods of set and reset states of flip-flop 172 remain constant. In particular they are to be equal.

Proceeding now with the description of the feedback loop, flip-flop 172 operates a switch 175 which in the set state of the flip-flop connects an output line 176 to the positive source of voltage potential B+ while for the reset state of flip-flop 172 switch 175 connects output line 176 to the source of negative voltage potential B−. B+ and B− have oppositely equal values relative to ground. This measure is required only as flip-flops in general operate between a particular voltage level and ground. The signal appearing in line 176 is a wave train oscillating about ground. In case of a phase error as defined the positive signals are of shorter or longer duration than the negative signals, for the correct phase positive and negative signals are equal. Thus, the average signal in line 176 is zero for correct relationships of reproduced and direct reference. A phase error is represented by a positive or negative D-C signal in the line 176, depending on whether the reproduced reference signals are somewhat too early or too late relative to the direct reference.

For the formation of this averaging signal, an active, low-pass filter 177 is connected to line 176. Filter 177 has a rolloff characteristic, for example, at about 20 c.p.s. in accordance with the expected maximum frequency of tape flutter. Filter 177, therefore, removes the frequency of the reference signal as produced in any of the previously described stages which may be 320, 640 or 960 c.p.s. Of course, the filter removes also higher harmonics incident to the square waves produced by flip-flop 172 so that the output of the low-pass active filter 177 is a very low frequency or D-C signal representing a variable or constant phase error in the tape drive. The output of the active low-pass filter 177 is a true error signal.

This error signal is fed to a lead-lag network 178 having a frequency selective characteristic; it provides increasing signal attenuation when the frequency of the error signal changes from about zero to 3 c.p.s. (lag-portion), but the attenuation again decreases for higher frequencies (lead-portion). Thus, a steady or very slowly variable phase error signal is recognized as a rather large error while the same phase error signal amplitudes are more attenuated if varying at a higher rate. The purpose thereof is to prevent hunting of the loop, which thus accounts for the lag-portion of the network as being effective between 0 and about 3 c.p.s., to decrease the error signal with increasing frequency within that range.

The relative boost of the amplitude output with increasing frequency in the range between 3 c.p.s. or 20 c.p.s. takes care of the rolloff of the response characteristics of the motor 100 for higher frequencies. The motor will respond less and less to braking signals of higher frequency. Therefore, the error signal amplitude must be boosted, which accounts for the lead-portion of the characteristics of network 178.

In the reproduce mode switch 22 connects network 178 to the speed selective trimmer network 141 already explained above and which provides some speed dependent adjustment of the particular signal level. The circuit network to which the output of network 141 is connected operates entirely independent from the tape speed, because motor 100 is not directly affected by the speed selection. On the other hand, the load conditions for the motor are somewhat different for different tape speeds so that the response to a specific control signal for the motor will be different for different tape speeds, even though the motor speed is the same for all tape speeds. Thus, trimmer network provides loop gain adjustment. This is necessary, to optimize system loop gain for each speed due to the variation in response capabilities of the rotating components at various operating speeds and also to compensate for the differences in the phase constant (volts/rad) of the phase detector system for different operating frequencies.

The circuit to which network 141 feeds its output has already been described for the record mode and the operation is in fact the same. The differential amplifier 140 boosts the gain of the error signal independent from the mode for controlling the production of a particular firing pulse for the SCR transistor 111 in the manner described above. In the record mode the phase of this firing pulse was constant; in the reproduce mode it varies in accordance with the error signal. In either case, there is a considerable gain between the error signal at the output side of filter 177, or the control signal at the output side of differetial amplifier 140, and the D-C component in the A-C supply for motor 100, so that the motor responds rapidly, even to small phase errors, and maintains the tape in the desired progressing positions.

A simplified modification for the error signal production and processing circuit is depicted somewhat schematically in FIG. 3. The motor control circuit is essentially similar to the one shown in FIG. 2 and the modification involves primarily the production of the D-C signal for the line 123 which controls the rate of charge for capacitor 125, which in turn controls the timing of the firing angle for the SCR. In this embodiment the base electrode of transistor 124 receives, in the record mode, directly a D-C voltage through a potentiometer 180 which is adjustable in order to provide for a particular braking angle during the record operation. In the reproduce mode switch 22' is placed in the alternative position to apply to the line 123 a signal produced as follows.

The reference transducer 26 is, of course, provided in the same manner and for the same purpose as before, and it produces a sine-wave output signal fed to a pulse shaper 181, which in turn produces rectangular pulses at its output side which are used to fire an unijunction transistor 182. Transistor 182 has its two base electrodes connected between B+ and ground. One of the base electrodes of this unijunction transistor 182 is capacitively connected to the control electrode of a silicon-controlled rectifier 183. Therefore, the silicon-controlled rectifier 183 is fired in synchronism with the pulses derived from the pulse shaper 181. A diode 184 has its anode connected to the other base electrode of transistor 182 and the cathode of diode 184 is connected to the collector of a transistor 185, the emitter of which is connected to ground.

Unijunction transistor 182 remains conductive as long as diode 184 is reversely biased through transistor 185 when nonconductive. Transistor 185 receives a control signal for the duration of a pulse-shaped reference signal derived from the reference source 25. This reference source can be an oscillator with a chain of binary type reducing stages such as was outlined with reference to FIG. 2. However, this embodiment is used to illustrate a somewhat different source of reference signals which can be used, in turn, in the system shown in FIG. 2. One will choose such a reference source specifically if the associated facsimile unit operates in synchronism with the local power line. The line signal is passed to one side of a phase detector 251 which drives a voltage controlled oscillator 252. The output of this oscillator is then processed by a circuit similar to the circuit connected to oscillator 151. Block 253 thus may include the elements 153 to 160 of FIG. 2. This block then has three possible outputs and the selection of one thereof is controlled by speed selector 30 such as the switches 160 and 161 in FIG. 2. The respective output of block 253 serves as reference controlling transistor 185. The lowest frequency output will still have a frequency higher than 60 to provide greater accuracy of motor speed control, so that block 253 includes further frequency reducing stages, the output of which then is applied to the other side of the phase detector 251, so that the VCO 252 is phase synchronized to the mains. The reference signal as derivable from unit 253 is, therefore, comprised of rectangularly shaped pulses having and establishing a particular phase relationship to the mains.

Transistor 185 is rendered conductive, for example, for positive going reference input pulses. Transistor 185, when conductive, applies essentially ground potential to the cathode of diode 184 as well as to the cathode of a diode 187, both of which are thereupon rendered conductive. The base electrode of unijunction transistor 182 to which the anode of rectifier 184 is connected is grounded when elements 184 and 185 conduct, whereupon the unijunction transistor 182 ceases to conduct. In addition, essentially ground potential is applied to the anode of the silicon-controlled rectifier 183 causing it to cease conduction.

One can see, therefore, that the duration of the state of conduction of the silicon-controlled rectifier 183 is a measure of the phase difference between the pulse trains applied, on the one hand, to the emitter electrode of the unijunction transistor 182 and to the base electrode of the regular transistor 185 on the other hand. The resulting pulse train is taken from the anode of silicon-controlled rectifier 183 and is passed through an integrator or low-pass filter 186 developing a D-C signal which in turn is applied to the line 123 for purposes described above.

This simplified version of the control circuit shown in FIG. 3 can be improved somewhat in order to boost the gain of the system and to remove any ripple of the signal in line 123. It should be noted that in the circuit shown in FIG. 2 no such ripples are present and the gain is sufficient. As shown in FIG. 4 the output of the phase detector, i.e., the anode of the silicon-controlled rectifier 183 can be connected as aforedescribed to integrator 186 which in turn feeds one side of a differential amplifier 190. The other side of differential amplifier 190 receives an adjustable but constant signal from a resistance network 191. Therefore, the differential amplifier 190 in effect amplifies the D-C signal as developed by the integrator-low-pass filter stage 186 and passes the same to the mode switch 22' to control the base electrode of transistor 124 as aforedescribed. It is now advisable to provide additionally a feedback network which comprises a capacitor 192 feeding the collector potential of transistor 124 back to the second input of the differential amplifier 190 to effectively remove any ripple in the D-C voltage so that the ramp voltage as created across the capacitor 125 has a rather smooth slope and is ripple-free and the firing point and firing angle for the SCR 11 as controlled from the capacitor 125 is accurately defined. The invention is not limited to the embodiments described above, but all changes and modifications thereof not constituting departures from the spirit and scope of the invention are intended to be covered by the following claims:

What is claimed is:

1. A facsimile data record-reproduce system comprising:

first means defining a source of facsimile signals;

a storage carrier movably disposed and having characteristics of reproducibly storing information signals;

second means disposed in relation to the carrier and connected for recording on the storage carrier facsimile signals and constant frequency reference signals as information signals, and disposed in relation to the carrier for reproducing the recorded facsimile signals and the recorded reference signals and including third means for providing first and second signal trains respectively representative of the reproduced facsimile and reference signals;

fourth means coupled to the storage carrier for moving the storage carrier and selectively obtaining a recording and reproduction of said information signals;

fifth means for providing reference signals;

sixth means connected to the third and the fifth means for providing an error signal in representation of phase difference between the second signals reproduced by the third means and the reference signals as concurrently provided by the fifth means and including means for eliminating the frequency of the reference signal from the error signal;

seventh means connected to be responsive to the error signal for increasing the gain of the error signal and providing a D-C control signal in response thereto;

eighth means included in the seventh means for providing a particular D-C control signal in the absence of an error signal during recording of information signals; and ninth means connected to the seventh, eighth and fourth means for controlling the speed and position of the fourth means for driving the storage carrier in accordance with the D-C control signal.

2. A system as set forth in claim 1, the fifth means including means for providing first reference signals for recording and second reference signals for reproducing, the sixth means responding to the signals of the second train and the second reference signals, the fourth means driving the carrier at first and second speeds respectively during recording and reproducing, the speeds differing corresponding to the frequency relation between the first and second reference signals.

3. A system as set forth in claim 2, the seventh means including means for adjusting the gain of the error signal in accordance with the speed as provided by the fourth means for the carrier.

4. A system as set forth in claim 1, the seventh means including means having a frequency dependent transmission characteristic to provide maximum of transmission for error signals having frequency of a few cycles per second.

5. A system as set forth in claim 1, the fourth means including driving means powered from an A-C source, the seventh and ninth means including means responsive to the D-C control signal for providing a sequence of control pulses having frequency related to the frequency of the A-C source and phase relative to the A-C source related to the error signal and further including means responsive to the control pulses for obtaining control of the power fed to the driving means for speed control thereof.

6. A facsimile record-reproduce system comprising:
first means defining a source for facsimile signals;
second means defining a source for reference signals and including means for providing first and second reference signals of differing and constant frequencies;
a storage carrier movably disposed and having characteristics of reproducibly storing information signals;
third means disposed in relation to the storage carrier and connected for recording on the storage carrier the facsimile signals and the second, constant frequency reference signals as information signals, and for reproducing the recorded information signals and including fourth means for providing first and second signal trains respectively representative of the reproduced facsimile signals and the reproduced second reference signals;
fifth means coupled to the storage carrier for moving the storage carrier for selectively obtaining recording and reproduction of said information signals;
the fifth means including sixth means for providing rotating motion in response to electrical signals, the speed of the motion being variable over a particular, small range in response to variations in the amplitude of a D-C component included in the electrical signal,
the fifth means further including seventh means adjustable in steps and coupling the sixth means to the storage carrier, so that the storage carrier moves at a speed selected from one of a plurality of speeds adjustable by the seventh means, and finely controlled by the sixth means, the plurality of speeds including a first and a second speed respectively for carrier movement during reproducing and recording;
eighth means connected to the second and the fourth means for providing an error signal representative of the phase difference between the signals of the second signal train and the first reference signals concurrently provided by the second means; and
ninth means connected to the eighth and sixth means and being responsive to the error signal for providing said D-C component of said electrical signal during reproducing and a predetermined D-C component during recording.

7. A facsimile record-reproduce system comprising:
first means defining a source for facsimile signals;
second means defining a source for constant frequency reference signals;
a storage carrier movably disposed and having characteristics of reproducibly storing information;
third means disposed in relation to the carrier and connected for recording on the storage carrier the facsimile signals and constant frequency reference signals as information signals and for reproducing the recorded information signals, the third means including fourth means for providing first and second signal trains respectively representative of the reproduced facsimile signals and of the reproduced reference signals;
fifth means coupled to the storage carrier for moving the storage carrier for selectively obtaining recording and reproduction of said information signals, the fifth means including sixth means for providing rotating motion in response to electrical signals, the speed of the motion being variable over a particular, small range in response to variations in the amplitude of a D-C component included in the electrical signal,
the fifth means including seventh means coupling the sixth means to the carrier to provide thereto essentially a first speed during recording and a second speed during reproducing;
eighth means coupled to one of the second and of the fourth means to provide a third signal train having fixed, phase and frequency relation to the second train or the reference signals of the second means, the relation being in accordance with the relation between the first and second speeds;
ninth means connected to the eighth means and the other one of the second and fourth means to provide a D-C signal representative of the phase difference between the signals of the third train and the other one of second train and reference signals of the second means; and
tenth means connected to the ninth means and the sixth means for controlling the D-C component in response to a predetermined D-C signal during recording.

8. A facsimile record-reproduce system comprising:
first means defining a source for facsimile signals;
a storage carriage movably disposed and having characteristics of reproducibly storing information signals;
second means disposed in relation to the carrier and connected for recording on the storage carrier the facsimile signal and constant frequency reference signals as information signals;
third means disposed in relation to the carrier for reproducing the recorded information signals and for providing first and second signal trains respectively representative of the recorded facsimile signals and the recorded reference signals, as reproduced;
fourth means coupled to the storage carrier for moving the storage carrier for selectively obtaining recording and reproduction of said information signals;
fifth means for providing reference signals;
sixth means connected to the third means for providing an error signal representative of the phase between the reference signals as produced by the third means and the reference signals as concurrently produced by fifth means;
seventh means connected to be responsive to the error signal for modifying the error signals in accordance with the frequency response characteristics of the fourth means; and
eighth means connected to the seventh and to the fourth means for controlling the speed and position of the fourth means for driving the storage carrier in accordance with the modified error signal during operation of the third means and in accordance with a predetermined substitute signal for the error signal during operation of the second means.

9. The method for transmitting facsimile signals, comprising:
providing a facsimile signal as representation of a document to be duplicated;
recording the facsimile signal together with a reference signal, and at a first rate corresponding to rate of providing of the facsimile signal;
reproducing the recorded facsimile and reference signals at a second rate higher than the first rate;

controlling the rate of reproduction in response to the reproduced reference signal; and
transmitting the reproduced facsimile signal at the second rate.

10. The method of duplicating a document at a remote location, comprising:
providing, in a first station, a facsimile signal as representation of a document to be duplicated;
recording the facsimile signal together with a reference signal and at a first rate corresponding to the rate in which the facsimile signal is being provided;
reproducing the recorded facsimile signal and reference signal at a second rate higher than the first rate;
controlling the rate of reproduction in response to the reproduced reference signals;
transmitting the reproduced facsimile signals from the first station to a second station at the second rate;
recording, in the second station, the transmitted received facsimile signals together with reference signals and at the second rate;
reproducing the recorded facsimile and reference signals at a third rate, lower than the second rate;
controlling the rate of reproduction at the third rate in response to the concurrently reproduced reference signals; and
composing a duplicate document from the reproduced facsimile signals at the third rate.

11. The method of providing the duplicate of a document represented as facsimile signals received from a remote location, comprising:
recording the received facsimile signals together with reference signals at a first rate;
reproducing the recorded facsimile signals and reference signals at a second rate lower than the first rate;
controlling the rate of reproduction at the second rate in response to the concurrently reproduced reference signals; and
composing a duplicate of the document from the reproduced facsimile signal at the second rate.

12. A tape drive unit wherein information and reference signals are recorded on a tape and an induction motor is connected to an A-C source and coupled to the tape for driving the tape, the improvement comprising:
first means coupled to the tape for reproducing the information and reference signals and providing first and second signal trains respectively representative thereof, the second train of reproduced reference signals having frequency substantially in excess of the A-C frequency of said source;
second means for providing a third train of reference signals having essentially the frequency of the signal of said second train;
third means connected to be responsive to the reference signals of the second and third trains and providing a D-C signal representation of the phase difference thereof;
fourth means connected to process the D-C signal including amplification for increasing the gain thereof; and
fifth means connected to the induction motor and further connected to be responsive to the amplified D-C signal to superimpose a D-C component upon the A-C voltage driving the induction motor for applying a braking torque to the motor corresponding to the phase difference between the third and second trains.

13. A tape drive unit as set forth in claim 12, the fifth means including unidirectionally effective circuit means in the A-C circuit of the induction motor for changing the impedance in the induction motor during half waves of a particular polarity of the A-C supply voltage, the fifth means further including means for converting the amplified D-C signal into a particular phase angle for a control pulse operating the unidirectionally conductive means.

14. A tape drive unit, as set forth in claim 12 and including means responsive to the D-C signal for frequency-dependently processing said D-C signal for maximum transmission in the range of a few cycles per second of D-C signal fluctuations.

15. A tape drive unit wherein information and reference signals are recorded on a tape and an induction motor is connected to an A-C source and coupled to the tape for driving the tape, the improvement comprising:
first means coupled to the tape for reproducing the information and reference signals and providing first and second signal trains respectively representative thereof, the second train of reproduced reference signals having frequency substantially in excess of the A-C frequency of said source;
second means for providing a third train of reference signals having essentially the frequency of the signal of said second train;
third means connected to be responsive to the reference signals of the second and third trains and providing a D-C signal representation of the phase difference thereof;
fourth means connected to the third means and providing a ramp signal having slope in accordance with the D-C signal, and being reset in dependence upon a particular polarity of the A-C voltage;
fifth means connected to the fourth means and the A-C voltage source, for providing a pulsating D-C voltage source, for providing a pulsating D-C from half waves of the A-C of opposite polarity, in response to traversal by the ramp signal of a particular level; and
means connected for superimposing the pulsating D-C upon A-C voltage driving the indication motor for applying a braking torque to the motor corresponding to the phase difference between the third and second trains.

16. The method of operating a facsimile unit and a recorder-reproducer unit in cooperation with the facsimile signal transmission facility, comprising the steps of:
providing a first, relatively low speed for the storage carrier in the recorder-reproducer unit when coupled to the facsimile unit for transfer of signals in either direction between the two units;
providing a second, relative high speed for the storage carrier in the recorder-reproducer unit when coupled to the facsimile signal transmission facility for transfer of signals in either direction between unit and facility;
recording on the carrier facsimile signals as received from the facsimile unit or the transmission facility concurrently with a constant frequency reference signal having frequency so that the recorded wavelength is the same for concurrent recording of facsimile signals at the first and at the second speed;
reproducing the reference signal concurrently with the recorded facsimile signals; and
controlling movement of the storage carrier in response to comparison of the reproduced reference signals and the concurrently produced reference signals, and including adaptation of the frequency of one of the reference signals compared to one of the first and second speeds.

17. A facsimile record-reproduce system including a storage carrier comprising:
first means defining a source for facsimile signals;
second means defining a source of signals having a particular frequency;
third means connected to the second means for selectively deriving from the signals having the particular frequency, one of a plurality of reference signals having differing frequencies;
fourth means disposed in relation to the carrier and connected for recording on the storage carrier the facsimile signals and one of the plurality of constant frequency reference signals as information signals and for reproducing the recorded information signals, the fourth means including fifth means for providing first and second signal trains respectively representative of the reproduced facsimile signals and reference signals;

sixth means coupled to the storage carrier for moving storage carrier for selectively obtaining recording and reproduction of said information signals, the sixth means including seventh means for providing rotating motion in response to electrical signals, the speed of the motion being variable over a particular, small range in response to variation in the electrical signals;

the sixth means including eighth means coupling the seventh means to the carrier to provide thereto one of a plurality of speeds;

ninth means connected to the third means and to the fifth means to compare the signals of the second train with one reference signal of the plurality and providing the electrical signals for obtaining the control of the seventh means.

18. A system as set forth in claim 17, the second means including a local oscillator, the third means including a plurality of binary stages selectively cascaded and connected to the oscillator.

19. A system as set forth in claim 17, the second means including a voltage controlled oscillator, a phase detector for receiving two inputs and controlling the oscillator in response to phase comparison of the two inputs, means for connecting a first input of the two inputs of the phase detector to the local power line and means including frequency reducing means connected to the output of the oscillator for providing a signal to the second input of the phase detector.

References Cited

UNITED STATES PATENTS

| | | | |
|---|---|---|---|
| 1,116,949 | 11/1914 | Stille. | |
| 2,419,431 | 4/1947 | Williams | 318—500 |
| 2,677,796 | 5/1954 | Geyger | 318—212 |
| 2,892,022 | 6/1959 | Houghton. | |
| 3,400,317 | 9/1968 | Thomas | 318—314 |

OTHER REFERENCES

Davies, Gomer L.: Magnetic Tape Instrumentation, New York, McGraw-Hill, 1961, pp. 137–152.

ROBERT L. GRIFFIN, Primary Examiner

H. W. BRITTON, Assistant Examiner

U.S. Cl. X.R.

178—6, 69.5; 179—15.55